Patented June 10, 1952

2,599,807

UNITED STATES PATENT OFFICE 2,599,807

ALKYLENE POLYAMINE METHYLENE PHOSPHONIC ACIDS

Frederick C. Bersworth, Verona, N. J.

No Drawing. Application June 1, 1950,
Serial No. 165,597

10 Claims. (Cl. 260—500)

This invention relates to chemistry and more particularly to organic chemistry and has for its object the provision of methylene phosphonic acid substituted alkylene poly- and di-amines and a method of producing same.

Another object is to provide methylene phosphonic acid substituted alkylene polyamines.

Still another object is to provide the mono- to tetra-substituted methylene phosphonic acid substituted ethylene diamine compounds.

Other objects will be apparent as the invention is more fully hereinafter disclosed.

In accordance with these objects I have discovered that the substitution reaction between a methylene phosphonic acid halide

(XCH$_2$PO(OH)$_2$ where X=halogen, and an alkylene amine (di- and poly-) in an alkaline pH aqueous solution at elevated temperatures may be carried out to substantial completion in an economically practical time with the reactants employed in substantially equivalent reacting weights.

In accordance with this discovery I have devised a general method of producing these methylene phosphonic substituted alkylene amines in which the alkylene amine is dissolved in water containing caustic alkali (NaOH) in an amount providing a pH of 10–11 and the solution is heated to a temperature of 60° to refluxing temperatures. A methylene phosphonic acid halide salt in aqueous solution is added to the heated reaction solution slowly, with agitation, in an amount providing the desired mono- to poly-substituted amine desired. After the methylene phosphonic acid halide is added to the reaction solution, the solution is heated to its boiling point under a reflux condenser for an extended time of from 1 to 5 hours until the reaction is fully completed and equilibrium conditions are obtained.

The reaction solution is then permitted to cool to room temperatures and the pH of the solution is lowered by HCl addition to a pH of about 6–7. The solution is then filtered to remove the sodium chloride crystals and other insolubles present therein.

The reaction solution is then concentrated to a solution containing 40% or more of solids and the substituted amino acid recovered therefrom by precipitation with ethyl alcohol. Alternatively the substituted amino acid may be recovered by neutralizing the solution with a strong mineral acid to a pH at which the amino acid is insoluble.

As one specific example of this the practice followed in the forming of the tetra methylene phosphonic acid derivative of ethylene diamine will be described.

The tetra-substituted compound is obtained by dissolving one molar weight of ethylene diamine in water to form a 60% solution. This solution is then heated to a temperature approximating 70° C. and a 30% solution of the methylene phosphonic acid chloride sodium salt

Cl·CH$_2$PO(ONa)$_2$ and an excess of a base such as Na$_2$CO$_3$ to maintain a pH of 10 to 11.5 are added slowly to the solution with constant agitation of the reaction solution until a total of four (4) molar weights of the chloromethylene phosphonic acid sodium salt has been added.

The solution is then heated under a reflux condenser to its boiling point for an extended time of from 1 to 5 hours or until equilibrium reaction conditions have been obtained and is permitted to cool to room temperatures and the pH of the solution is lowered from the reaction pH of 10–11 to a pH within the range 6–7.

After allowing the reaction solution to settle the precipitated sodium chloride and other insolubles are removed by filtration. The solution is now, preferably, evaporated to dryness on the water bath or under vacuum and the dry residues are treated with the minimum amount of water required to dissolve up the substituted amine to form about a 40% to 50% solution and the undissolved residues, which consist mostly of sodium chloride, are removed by filtration. Then I add an equal volume of ethyl alcohol to the solution to precipitate the tetra-substituted ethylene diamine and, preferably, repeat this alcohol precipitation one or more times to remove the last traces of impurities. Alternatively, the solution may be acidified with HCl to a pH of about 2 to precipitate the free amino acid.

The resultant tetra-substituted methylene phosphonic ethylene diamine is a hygroscopic white crystalline compound which is soluble in pure water reacting readily with poly-valent metal ions in aqueous solution to form water soluble complexes therewith.

My tests indicate that this compound has a structural formula substantially conforming to the following:

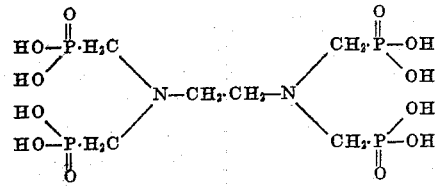

The OH groups attached to each phosphorus atom react as an acid towards basic metal compounds such as oxides, hydroxides and carbonates and the phosphonic groups on the same or spaced nitrogen atoms react with poly-valent metal ions to form closed ring groups.

One of the peculiar chemical characteristics of this compound is that when two of the phosphonic acid groups are neutralized by alkali metal hydroxide to form the di-alkali metal salt- di-phosphonic acid compound, the compound remains soluble over a wide range of pH and the remaining phosphonic groups react as chelating groups for mono- and poly-valent metal ions without insolubilizing the compound.

As an illustration of this the di-alkali metal salt- di-acid compound in aqueous solution will react with freshly precipitated iron hydroxide $Fe(OH)_3$ substantially as follows:

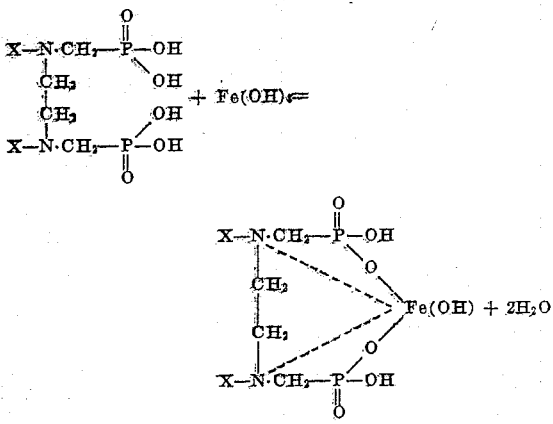

where X represents the two alkali metal neutralized phosphonic acid groups of the acid-salt. In this $Fe^{III}$ chelate the residual valencies of the amino nitrogens, indicated by dotted lines hold the $Fe^{III}$ ion in chelate combination.

Other poly-valent metal ions are in general also chelated substantially as indicated in this equation. Sodium ions are weakly associated with these acid phosphonic groups. However, the sodium salts of the tetra-substituted compound shown above are themselves strong chelating agents for most poly-valent metals.

As an example, the copper salt of the di-alkali metal salt- di-acid compound conforms to the following structural formula:

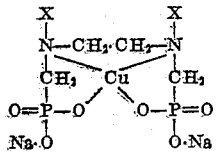

where X represents the alkali metal neutralized phosphonic groups.

The copper ions of this salt may be precipitated out of chemical combination by $H_2S$ or by any water soluble metal sulfide, such as sodium sulfide. However, free caustic alkali (NaOH) or other common precipitating agents will not precipitate the copper as insoluble copper hydroxide.

It is believed apparent that the tetra-substituted methylene phosphonic acid ethylene diamine compound of the present invention has wide utility in the art as a chelating agent and as a complexing agent for mono- and polyvalent metal ions and that a large number of neutral salts and poly metallic salts and acid salts of the compound may be formed and utilized in this art.

In general the use of less than four moles of chloromethylene phosphonic acid salts per mole of ethylene diamine in the synthesis described above results in the formation of a mixture of substituted products which differ in the number of amino hydrogens replaced by methylene phosphonic acid groups. Thus the use of three moles of reagent per mole of ethylene diamine gives a mixture which tests indicate contains di-, tri- and tetra-methylene phosphonate of ethylene diamine. The optimum yield of the di-substituted derivative, having the following formula:

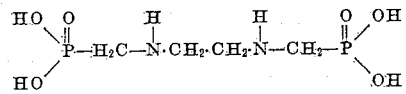

is obtained when slightly more than two moles of reagent are used per mole of ethylene diamine. Here, also, however, a mixture (of mono-, di- and tri-substituted compounds) is obtained that consists predominately of the di-substituted product.

I have found that these intermediate products are also excellent chelating agents and are useful for a great many purposes. However, their chelating power is in general less than that of the tetra methylene phosphonic acid. Consequently, a metal ion such as copper, will combine preferentially with the tetra-substituted reagent when treated with a mixture of ethylene diamine dimethylene phosphonic acid and ethylene diamine tetramethylene phosphonic acid. The reactivity of ethylene diamine trimethylene phosphonic acid seems to be intermediate between that of the tetra and that of the di-substituted compounds.

Another method has been developed which gives good yields of symmetrical ethylene diamine dimethylene phosphonic acid free of the impurities or other derivatives obtained in the process described in example 1 above. This involves the treatment of an aqueous solution two molar portions of amino methylene phosphonic acid with one molar proportion of an alkylene dihalide at an elevated temperature for a length of time sufficient to insure complete reaction. This time may amount to several days at low temperature in aqueous solution to a few hours under reflux in 50% ethanol. The reaction may be represented as follows: The solution must be maintained neutral or alkaline.

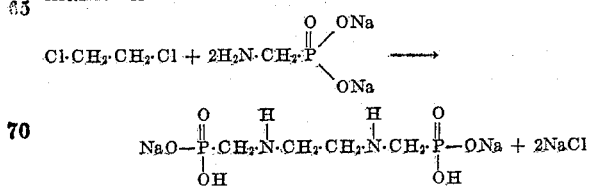

The method of isolation of the product is the same as already described for the tetra-phosphonic acid.

An alternative method of the preparation of the symmetrical ethylene diamine di(methylene phosphonic acid) involves the use of hydroxymethyl phosphonic acid di-alkyl ester,

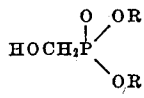

which is first chlorinated and then treated with ethylene diamine in the ratio of two moles of the phosphonic ester and one mole of ethylene diamine:

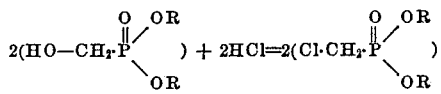

The resulting tetra-alkyl ester may then be hydrolyzed with acid or saponified with a base to give the ethylene diamine dimethylene phosphonic acid or its salt, respectively.

It is believed apparent that in place of ethylene diamine, I may employ any other alkylene polyamine such as propylenediamine, trimethylene diamine, and diethylene triamine, the substitution reaction described being applicable chemically to any such alkylene amine, and for simplification in defining the present invention the term ethylene diamine as it hereinafter appears in the claims is meant to include any and all such substantially equivalent alkylene amines.

Having described the present invention generically and specifically and disclosed a specific embodiment of the same with several modifications, it is believed apparent that the invention may be widely varied and modified without essential departure therefrom and all such modifications and departures from the invention as hereinabove disclosed are contemplated as may fall within the scope of the following claims.

What I claim is:

1. Compounds having the formulas:

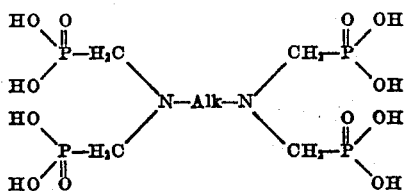

where Alk refers to any aliphatic alkylene carbon group ($C_nH_{2n}$) containing from 2 to 6 carbon atoms.

2. The alkali metal salts of the products of claim 1.

3. Compounds having the formula:

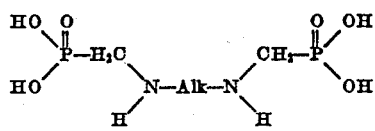

where Alk refers to any aliphatic alkylene carbon group ($C_nH_{2n}$) containing from 2 to 6 carbon atoms.

4. The alkali metal salts of the products of claim 3.

5. Compounds having the formula:

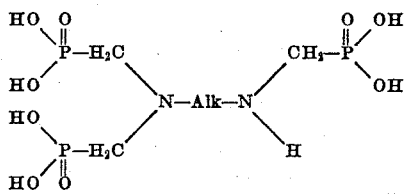

where Alk refers to any aliphatic alkylene carbon group ($C_nH_{2n}$) containing from 2 to 6 carbon atoms.

6. Alkali metal salts of the compounds of claim 5.

7. Ethylene diamine tetramethylene phosphonic acid conforming to the following formula:

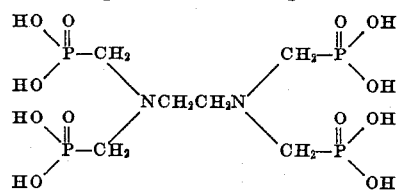

8. Ethylene diamine trimethylene phosphonic acid conforming to the following formula:

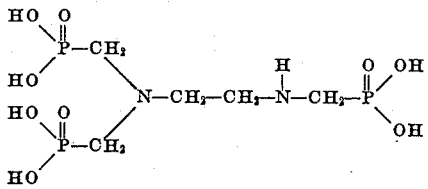

9. Ethylene diamine dimethylene phosphonic acid conforming to the following formula:

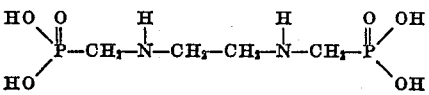

10. Compounds conforming to the formula:

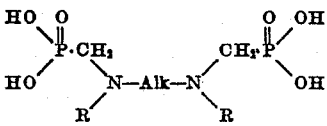

where Alk consists of an alkylene group ($C_nH_{2n}$) containing from 2 to 6 carbon atoms and R is one of the groups consisting of

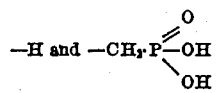

FREDERICK C. BERSWORTH.

REFERENCES CITED

The following references are of record in the file of this patent:

UNITED STATES PATENTS

| Number | Name | Date |
|---|---|---|
| 2,227,963 | Dickey et al. | Jan. 7, 1941 |
| 2,328,358 | Pikl | Aug. 31, 1943 |